| United States Patent [19] | [11] Patent Number: 4,679,348 |
| Wimberley | [45] Date of Patent: Jul. 14, 1987 |

[54] TRAP DRAG

[76] Inventor: Eddie L. Wimberley, P.O. Box 266, Camp Wood, Tex. 78833

[21] Appl. No.: 912,326

[22] Filed: Sep. 29, 1986

[51] Int. Cl.[4] ............................................. A01M 23/24
[52] U.S. Cl. ...................................... 43/96; 294/81.6; 114/301
[58] Field of Search .................... 43/58, 96; 294/66 R; 114/305, 309, 310, 301

[56] References Cited

U.S. PATENT DOCUMENTS 169,069 10/1875 Whitecar .............................. 114/310

Primary Examiner—Nicholas P. Godici
Assistant Examiner—Carmine Cuda
Attorney, Agent, or Firm—Sisson & Smith

[57] ABSTRACT

A game trap drag having arms, flukes, and a penetration enhancement/antihitching member oriented in relation to each other and the drag shank such that the drag more effectively penetrates the earth's surface when the trapped animal attempts to drag the trap away from the set location. The penetration enhancement/antihitching member raises the crown of the trap drag above the horizontal of the earth's surface providing an improved ground engagement angle. The penetration enhancement/antihitching member further functions to prevent the trap-to-drag chain from becoming hitched around the drag.

3 Claims, 9 Drawing Figures

4,679,348

TRAP DRAG

BACKGROUND OF THE INVENTION

The present invention relates to attachments for game traps, and is directed more particularly to a trap drag having an antihitching member which also enhances fluke penetration. More particularly, the improved trap drag is especially suited for open plains country.

Existing devices which may be pertinent to this invention are listed as follows:

U.S. Pat. No. 1,258,023—Mar. 5, 1918;
U.S. Pat. No. 1,454,015—May 1, 1923;
U.S. Pat. No. 2,521,537—Sept. 5, 1950;
U.S. Pat. No. 4,130,961—Dec. 26, 1978;
U.S. Pat. No. 4,145,835—Mar. 27, 1979.

These patents disclose such things as a "retractable" type hook wherein the ground engaging members move into position should the animal attempt to drag the trap; drags which act as grappling devices only, designed to hook trees, brush, or other obstruction; grapples which are foldable or collapsible to reduce bulk and improve storage and transport.

Further, various anchor devices, while not fully analogous art, disclose elements similar to drags. U.S. Pat. No. 3,430,596 to Hysaw and U.S. Pat. No. 481,782 to Chrietzberg show rotatably mounted elevating units, however, they result in an elevation of both arms of the anchor for improving simultaneous engagement of both flukes.

None of these known devices offers the new and novel features of the invention disclosed herein.

SUMMARY OF THE INVENTION

The primary improvements of the present invention over currently produced drags and/or grapples is the ability of the device to quickly and efficiently engage in the ground and to eliminate a long standing problem in the trapping industry known as "half-hitching" or "hitching." This makes it usable in open plains country where it is not practical to use existing drags which are not consistently dependable for providing braking action.

As previously stated the primary purposes of currently produced trap drags is to act as grappling devices only, designed to hook onto trees, brush, or other obstructions, making them practically useless in open country. Due to the ability of the present invention to quickly engage in the ground and to eliminate "hitching," as well as to serve as a grapple, the invention is an extremely valuable piece of equipment for the trappers in the western and mid-western states who are constantly confronted with open plains country. The principal trapping method used in the plains country has been to stake traps solidly to the ground, which results in animal loss by the animals pulling out body members from the trap on the initial lunge while the trap remains solidly affixed to the ground. Further, staking the trap solidly leaves the animal clearly visible. Trap sets made close to travelled paths result in stolen traps and animals. Such loss is an ever increasing problem due to the high value of animal fur and high trap prices.

The present invention allows the trapper to set the trap along roads and paths in open country without fear of the animal or trap being stolen. Such sets may be made along the roads because the trapped animal is able to take the trap a short distance from the road while leaving a clearly marked path for the trapper to follow. There are less animal pullout problems because the trap is not solidly staked to the ground.

The efficiency of ground engagement of the present invention can be varied so as to increase or decrease the distance of animal travel from the set location. This is accomplished by using various trap to drag chain lengths. Being able to vary ground engagement of the present device means the device can be set up for further animal travel away from the high visibility set locations.

The present device has proven to consistently stop animals such as coyotes and bobcats within a very short distance. Additionally, the device leaves a clearly marked trail in the ground for tracking the animal and trap.

A long standing problem with existing drags is known as "half-hitching" or "hitching." This problem is illustrated in FIGS. 4A-4E. Once the drag has engaged the ground the animal is held by the trap at one end of the trap-to-drag chain. The fixed drag functions as the center of a circle having a radius equal to the length of the trap-to-drag chain. As the animal attempts to free itself, it will tend to travel in a circular arc around the fixed drag. The chain will often wrap around an extended arm of the drag as the animal moves in this circular direction. As the animal passes behind the fixed drag a second time, the chain becomes half-hitched or hitched around the arm. Continued travel away from the drag (away from the shank and crown), causes the drag to be disengaged. Once the animal disengages the drag it will be pulled in such a way as to prevent it from re-engaging because the chain is hitched around an arm.

The present device incorporates a novel, antihitching slide plate which protects the arms of the drag from becoming hitched by the chain. This same antihitch slide plate acts additionally as a penetration enhancement member.

The present invention provides a drag which has improved ground engagement as a result of improving the angle of penetration, which rotates another bill into position for ground engagement should one bill be pulled out of the ground as the trapped animal attempts to pull away, and which eliminates the hitching of the trap to drag chain around the arms of the drag.

DESCRIPTION OF THE PREFERRED EMBODIMENT

Figure 1:
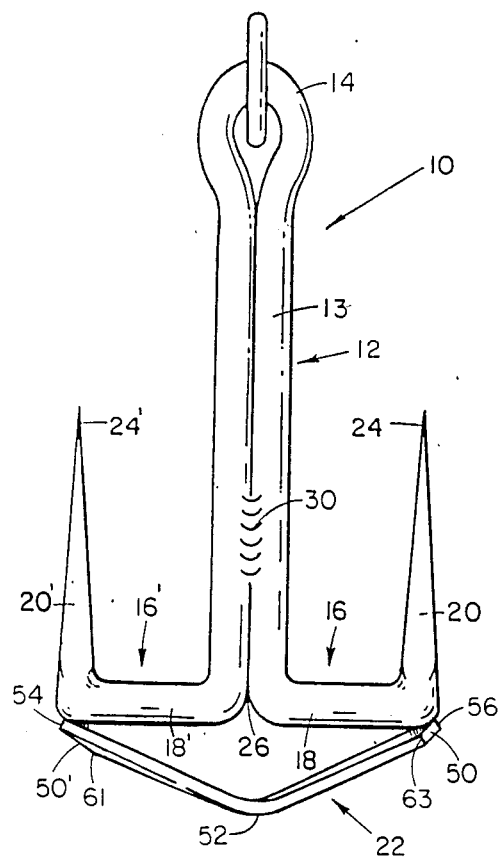
FIG. 1 is a front view of the device.
Figure 2:
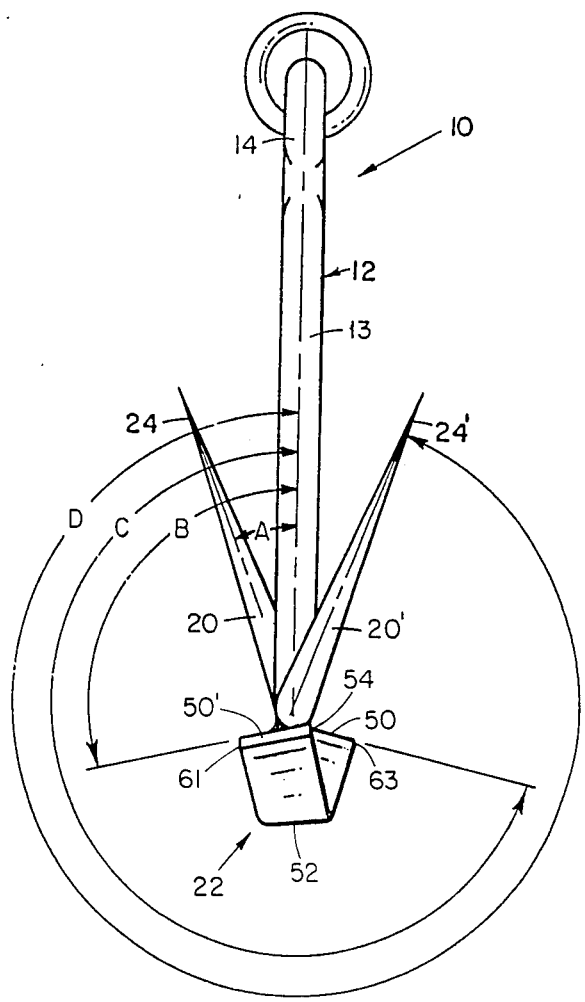
FIG. 2 is a side view of the device.

Referring to FIGS. 1, 2, and 3, reference numeral 10 indicates in general the trap drag of this invention. Looking at FIG. 1, the basic component units of the device will be described in detail. A two-legged shank portion 12 is formed with an eye 14 at one end thereof. This eye 14 is provided for attaching a trap by any suitable means. In the preferred embodiment shank 12 is formed by the bending of a unitary rod 13 to form the shank illustrated in FIGS. 1, 2, and 3. Each leg of shank 12 is formed in the shape of a bill 16 and 16'. Bill 16 is further made up of an arm 18 and a fluke 20. The end of bill 16 and, more particularly, the end of fluke 20 is sharpened to a tip 24.

Further, the other leg of shank 12 is formed to shape a bill 16', diametrically opposed to bill 16, having arm 18', fluke 20', said fluke 20' tapering to a point 24'.

A penetration enhancement/antihitching member 22 is attached at one end to arm 18 and at a second end to arm 18'.

The two-legged shank 12 is tack-welded at various locations 30 to improve structural integrity.

While the preferred embodiment for drag 10 envisions the use of one single rod bent and shaped in the configuration disclosed herein with penetration enhancement/antihitching member 22 separately affixed or welded to bills 16 and 16', it is recognized that the drag 10 can be constructed of separate sections securely affixed to one another by welding or other appropriate fastening means, could be constructed as a casting, or could even be made of molded plastic construction.

As shown in FIG. 1, the preferred embodiment of the device calls for arm portions 18 and 18' to be at essentially right angles to shank 12. It can be further seen from FIG. 1 that the preferred embodiment has flukes 20 and 20' at essentially right angles to said arms 18 and 18', respectively. However, the best results are obtained in ground engagement and device rotation when flukes 24 and 24' are at angles between 5°-15° from a plane perpendicular to the longitudinal axis of arms 18 and 18' and passing through a longitudinal axis of shank 12.

FIG. 1 also illustrates penetration enhancement/antihitching member 22 attached to arms 18 and 18' and curving or arching over the crown 26.

Antihitching member 22 is constructed from a rigid piece of flat stock which has been sized to extend precisely from arm 18 to arm 18'. The member 22 is bent in the middle to form an apex 52. Member 22 is slightly twisted in a helical manner so that one corner 54 may be welded or similarly attached to the junction of fluke 20' and arm 18', while the diagonally opposite corner 56 on end 50 is attached to the junction of fluke 20 and arm 18. Apex 52 is aligned with the longitudinal axis of shank 12 and crown 26.

FIG. 2 shows the invention in a side view. FIG. 2 also shows the angular relationships of the flukes 20 and 20' to shank 12, the angular relationship between penetration enhancement/antihitching member 22 to shank member 12, and the angular relationship between the flukes 20 and 20' and the penetration enhancement/antihitching member 22. All of these angular relationships can be compared when measuring the angles in a counterclockwise direction from a plane which includes the longitudinal axes of the two legs of shank 12 and the longitudinal axes of arm members 18 and 18'.

As can be seen in FIG. 2, angle A represents the angle formed by the intersection of a line drawn through the longitudinal axis of fluke 20 and a line drawn along a plane which includes the longitudinal axis of either leg of shank 12 and the longitudinal axes of arm members 18 and 18'. While the preferred embodiment of the present device is able to function when angle A is greater than 0° but less than 90°, the best results are obtained when angle A is between 15° to 35°.

Angle D represents the angular relationship between main shank 12 and fluke 20'. Angle D is measured as the angle formed from the intersection of a line along a plane which includes the longitudinal axis of either leg of shank 12 and the longitudinal axes of arm members 18 and 18' and a line drawn through the longitudinal axis of fluke 20'. While the preferred embodiment of the present invention will operate when angle D is greater than 270° but less than 360°, optimum performance of the device is achieved when angle D is between 325° and 345°.

FIG. 2 further shows the angular relationship between shank portion 12 and a first end 50 of penetration enhancement/antihitching member 22. This angular relationship is expressed as angle B. Angle B is formed by the intersection of a line drawn along a plane which includes the longitudinal axis of either leg of shank 12 and the longitudinal axes of arm members 18 and 18' and a line drawn through the longitudinal axis of end 50 of penetration enhancement/antihitching member 22. While the preferred embodiment of the device will function when angle B is greater than 90° but less than 180°, optimum performance of the device is achieved when angle B is between 110° and 140°.

Angle C, as shown in FIG. 2, represents the angular relationship between either leg of shank 12 and a second end 50 penetration enhancement/antihitching member 22. Angle C is formed by the intersection of a line drawn along a plane which includes the longitudinal axis of either leg of shank 12 and the longitudinal axes of arm members 18 and 18' and a line drawn through the longitudinal axis of end 50' of penetration enhancement/antihitching member 22. While the preferred embodiment of the device will function when angle C is greater than 180° but less than 270°, the optimum performance of the device is achieved when angle C is between 220° and 250°.

The angular relationship of member 22 to the other elements of the drag 10 is achieved by the helical twisting of member 22 as discussed above. Without the twisting of member 22, ends 50 and 50' tend to be more perpendicular to the longitudinal axis of shank 12 than is desired for optimum performance. Again, as can be seen in FIG. 2, apex 52 extends outwardly beyond crown 26 and is aligned with shank 12. Member 22 provides a sliding surface on either the left side or right side of crown 26 for chain 40 to slide off. Thus, chain 40 will not be able to engage (hitch around) the crown 26 or the arms 18 or 18'.

Figure 3A:
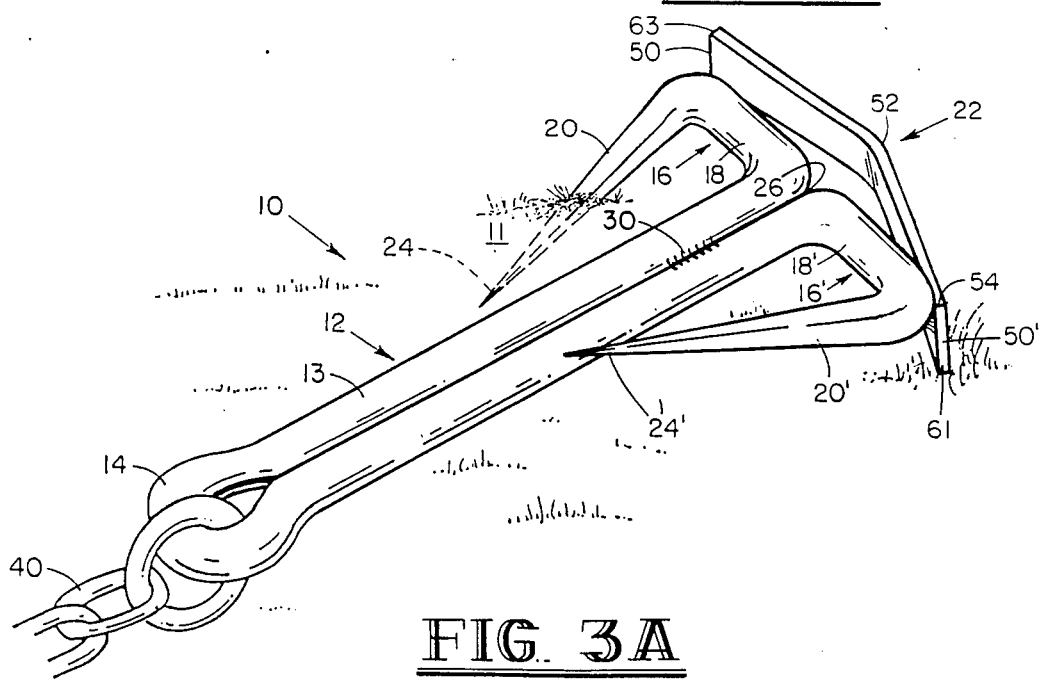
FIG. 3A is a perspective view of the device as it appears on a flat, plain surface, initially engaged.

FIG. 3A is a perspective view of the device as it would appear on a flat, plain surface. As can be seen from FIG. 3A, as fluke 20 begins to penetrate the ground surface, end 50' of penetration enhancement/antihitching member 22 supports crown 26 above the level of the ground. Because crown 26 is above the level of the ground, fluke 20 is continually urged into achieving greater penetration angle, improving the ground engagement characteristics of drag 10. Because of the construction and angular arrangement of fluke member 20 to arm member 18 and main shank 12, drag 10 tends to rotate in a clockwise direction as tip 24 of fluke 20 penetrates deeper into the earth's surface. When drag 10 has nearly completed a one-half revolution, end 50 of penetration enhancement/antihitching member 22 will begin supporting crown 26 of drag 10 above the horizontal, thus urging and enhancing the penetration of fluke 20' as fluke 20' begins to engage the earth's surface.

It should be further noted from FIG. 3A that as end 50' of penetration enhancement/antihitching member 22 raises crown 26 above the earth's surface, the center of gravity of drag 10 is shifted some to increase the ground engagement of fluke 20.

FIG. 3A further indicates that the perpendicular arrangement of the various elements of the invention to each other results in a more parallel relationship between the drag chain 40 and the fluke members 20 and 20'. As the trapped animal attempts to drag the trap away from the set location, the present invention leads to a situation wherein the flukes 20 and 20' remain more parallel to the chain 40. This results in improved penetration of the device into the earth's surface.

Figure 3B:
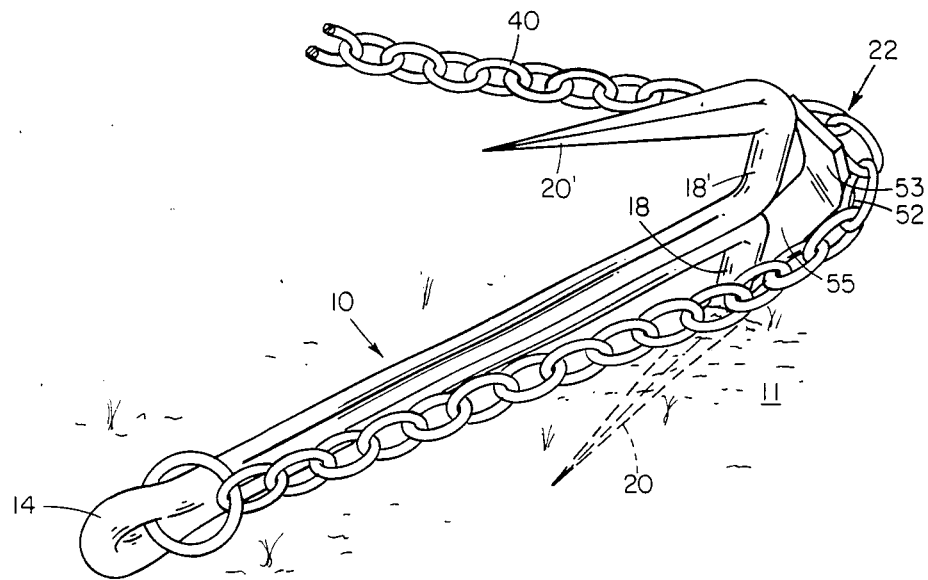
FIG. 3B is a perspective view of the device fully engaged in the ground with the chain contacting the antihitching member of the invention.

FIG. 3B illustrates drag 10 with fluke 20 fully engaged in ground 11. Fluke 20' is shown extending above and nearly parallel to the ground 11. Thus, arm 18' is exposed generally perpendicular to the ground 11, and presents an object around which chain 40 can easily be hitched as the animal circles around the fixed drag 10.

Chain 40 is shown in FIG. 3B as contacting antihitching member 22 at or near apex 52. As a trapped animal continues to circle the drag 10, chain 40 slides off side 53 of member 22, allowing the chain 40 to again extend fully. Thus, chain 40 cannot hitch around arm 18'. Should the chain 40 slide to the other side 55 of apex 52, the chain causes fluke 20 to be pulled from the ground 11. Fluke 20' is then rotated in position for engagement. While the trapped animal may be able to disengage the drag momentarily, the drag is still pulled in a direction enabling flukes 20 and 20' to engage.

Figure 4A:
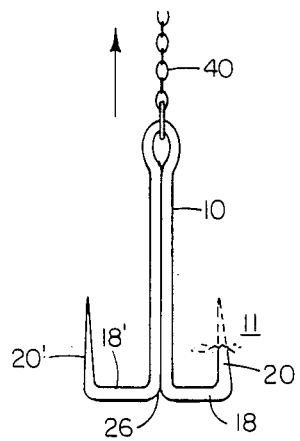
FIG. 4A-4E illustrates the "hitching" phenomenon discussed herein.
Figure 4C:
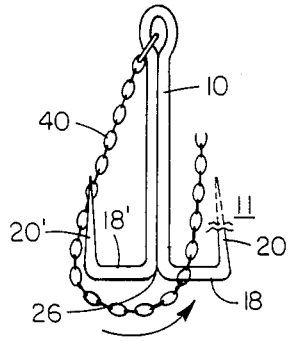
Figure 4E:
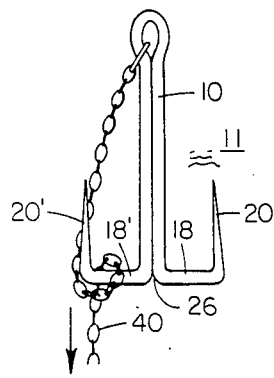
Figure 4B:
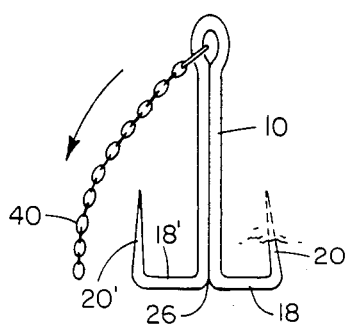

Turning to FIGS. 4A-4E, the hitching phenomenon is illustrated on a drag not having member 22. FIG. 4A shows fluke 20 of drag 10 engaged and chain 40 being pulled in a generally forward direction by the trapped animal. FIG. 4B illustrates the chain 40 being carried in a rearward direction as the animal begins to circle the fixed drag.

Figure 4D:
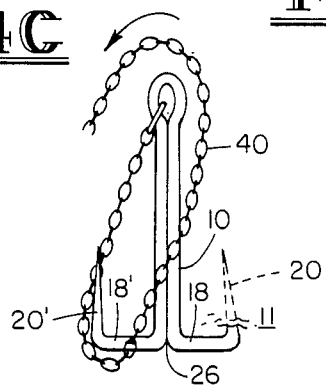

In FIG. 4C the animal has nearly completed one full revolution around the drag 10 and chain 40 is beginning to wrap around arm 18'. In the more traditional drags, the chain 40 will engage at the crown 26. FIG. 4D next illustrates the animal beginning to make its second swing around the drag 10. Since the chain 40 has engaged arm 18' it is held in a fixed or steady position. Finally, FIG. 4E shows that the animal has moved rearward, the chain 40 has hitched around arm 18', and pulled fluke 20 of the drag 10 from the ground 11. Since the drag may now be pulled such that flukes 20 and 20' are not presented for engagement, the animal, while still engaged in the trap, is able to move away from the immediate location. The injured animal, the trap, and the drag in most cases are lost.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A game trap drag for attachment to a game trap comprising:
   a shank;
   means for attaching said trap to said shank near a first end of said shank;
   first and second arms extending generally perpendicularly outward from a second end of said shank and forming a crown at said second end;
   first and second flukes attached on each of said first and second arm members, respectively, and radially extending outward therefrom to terminate in a point; and
   an antihitching member consisting of a bar bent to define an apex between a first and second end of said antihitching member, said antihitching member attached at the junction of said first fluke and said first arm, and further attached at the junction of said second fluke and said second arm, said apex thereby extending outwardly beyond said crown.

2. A game trap drag for attachment to a game trap comprising:
   a shank;
   means for attaching said trap to said shank near a first end of said shank;
   first and second arms extending generally perpendicularly outward from a second end of said shank and forming a crown at said second end;
   first and second flukes attached on each of said first and second arm members, respectively, and radially extending outward therefrom to terminate in a point; and
   a substantially rigid and flat antihitching member bent in its center portion to form an apex between a first and second end of said antihitching member, said antihitching member having a first corner on said first end diagonally opposite a second corner on said second end, said first corner attached at the junction of said first fluke and said first arm, and said second corner attached at the junction of said second fluke and said second arm, said apex thereby extending outwardly beyond said crown.

3. The invention of claim 2 wherein said first end of said antihitching member has a second penetration enhancement corner and said second end of said antihitching member has a first penetration enhancement corner, said penetration enhancement corners radially extending outward from the longitudinal axes of said arm members, said penetration enhancement corners and said fluke members being oriented along and around said arm member such that said first penetration enhancement corner urges said first fluke member on said first arm downward as said drag is moved forward with said first penetration enhancement corner contacting the surface along which said drag is moved.

* * * * *